(12) United States Patent
Medvinsky et al.

(10) Patent No.: US 7,451,312 B2
(45) Date of Patent: Nov. 11, 2008

(54) AUTHENTICATED DYNAMIC ADDRESS ASSIGNMENT

(75) Inventors: Alexander Medvinsky, San Diego, CA (US); Poornima Lalwaney, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 976 days.

(21) Appl. No.: 09/799,918

(22) Filed: Mar. 5, 2001

(65) Prior Publication Data
US 2001/0047484 A1 Nov. 29, 2001

Related U.S. Application Data

(60) Provisional application No. 60/188,925, filed on Mar. 7, 2000.

(51) Int. Cl.
*H04L 9/00* (2006.01)

(52) U.S. Cl. .......................... 713/168; 726/10; 726/11; 726/12; 726/13; 713/151; 713/153; 713/154; 713/169; 713/170; 380/278; 380/279; 380/282; 709/222; 709/226

(58) Field of Classification Search .............. 713/168, 713/100, 200, 151, 153, 154, 169, 170; 709/203, 709/245, 222, 226; 726/10, 15, 11, 12, 13; 380/278, 279, 282
See application file for complete search history.

(56) References Cited

U.S. PATENT DOCUMENTS 6,286,038 B1 * 9/2001 Reichmeyer et al. ........ 709/220
6,345,303 B1 * 2/2002 Knauerhase et al. ........ 709/238
6,442,588 B1 * 8/2002 Clark et al. ................ 709/203

OTHER PUBLICATIONS

Stallings, Cryptography and network security, 1999, Prentice Hall, 2nd Edition, pp. 324-325 and p. 333.*
Stallings, Cryptography and Network Security, 1999, Prentice Hall, pp. 337.*
Security on the Move: Indirect Authentication Using Kerberos; A. Fox, S. Gribble, Mobile Computing and Networking, 'Online! 1996.
Network Access Control for DHCP Environment; K. Kobayashi et al., IEICE Transactions on Communications, Institute of Electronics Information and Comm. Eng. , Tokyo, JP, vol. E81-B, No. 9, Sep. 1998.
Kerberos V Authentication Mode for Uninitialized Clients; S. Medvinsky, P. Lalwaney, Internet Draft, 'Online!, Mar. 2000.
Dynamic Host Configuration Protocol; Droms, R., Arbaugh, W.; RFC 2131, Bucknell Uniersity, Mar.1997.
Authentication for DHCP Messages; Droms, R., Arbaugh, W.; draft-ietf-dhc-authentication-15.txt, Nov. 2000.
Integration of DCE with a Public Key Infrastructure; Moses, T.; internet document dated Mar. 7, 2000.

(Continued)

*Primary Examiner*—Kimyen Vu
*Assistant Examiner*—Beemnet W Dada
(74) *Attorney, Agent, or Firm*—Stewart M. Wiener

(57) ABSTRACT

A method for an uninitialized client to obtain credentials from a server which are then used to provide authenticated exchange for network configuration parameter assignment. The obtained credentials can be applied to an authentication option when a dynamic host configuration protocol (DHCP) is being used for address assignment.

12 Claims, 10 Drawing Sheets

OTHER PUBLICATIONS

Public Key Cryptography for KDC Recovery in Kerberos V5; Jonathan Trostle; internet draft dated Mar. 7, 2000.

DHCP Authentication Via kerberos V; Hornstein K., Lemon T.; draft-hornstein-dhc-kerbauth-01.txt, Oct 1999.

Realm Specific IP: Protocol Specification; Borella, M., Grabelsky, D., Lo, J., Tuniguchi, K.; draft-ieft-nat-rsip-protocol-07.txt, Jul. 2000.

Service Location Protocol Version 2; Guttman, E., Perkins, C. Veizades, J., Day, M.; RFC 2608, Jun. 1999.

The Kerberos Network Authentication Service (V5); Neuman, C., Kohl, J., Ts'o, T.; draft-ietf-cat-kerberos-revisions-04.txt, Jun. 1999.

Initial Authentication and Pass Through Authentication Using Kerberos V5 and the GSS-API (LAKERB); Swift, M., Trostle, J.; draft-ietf-cat-jakerb-03.txt, Sep. 1999.

Public Key Cryptography for Initial Authentication in Kerberos; Tung, B., Neuman, C., Hur, M., Medvinsky, A., Medvinsky, S., Wray, J., Trostle, J.; draft-ieft-cat-pk-init-10.txt, Sep. 1999.

The MD5 Message-Digest Algorithm; Rivest, R.; RFC 1321, Apr. 1992.

HMAC: Keyed-Hashing for Message Authentication; Krawczyk, H., Bellare, M. and Canetti, R.; RFC 2104, Feb. 1997.

Secure Hash Standard; NIST, FIPS Pub. 180-1; Apr. 1995.

\* cited by examiner

AUTHENTICATED DYNAMIC ADDRESS ASSIGNMENT

This application claims the benefit of U.S. provisional application 60/188,925 filed on Mar. 7, 2000 which is hereby incorporated by reference.

BACKGROUND

One embodiment of the present invention broadly relates to key management from an uninitialized client and to a subsequent authenticated exchange for any system that integrates Kerberos Security with a dynamic address assignment scheme, such as a dynamic host configuration protocol ("DHCP"). Another embodiment broadly relates generally to network protocol implementation and, more particularly, to facilitating an uninitialized client in obtaining credentials and in conducting authenticated exchanges for network address assignment using DHCP, Kerberos Security and/or other applicable protocols. Thus, it can specifically provide a method for an uninitialized client to obtain credentials from a Kerberos server which are then used to provide authenticated exchange for network address assignment. The obtained credentials can be applied to an authentication option when DHCP is being employed for address assignment.

Modern networks are highly flexible. For example, individual network elements can be implemented physically and as processes, and can further function individually or in a more distributed manner. Each element can also be dynamically activated, de-activated and re-configured for performing a variety of operations. Considerable flexibility is also enabled via dynamic physical and virtual connection of individual elements and element groups. Thus, in a given instance, one element might require the use or sharing of resources with one or more other elements, each of which might exist locally or remotely within some other physical LAN or virtual domain. During a given exchange, a network element might also operate as a traditional client (e.g., by seeking services), a traditional server (e.g., by providing services) or both.

Given their high complexity, the implementation and management of modern networks is increasingly conducted in accordance with existing and emerging standards rather than through the use of proprietary solutions. For example, standards such as the dynamic host configuration protocol ("DHCP") have been widely adopted for dynamically assigning addresses (e.g., from a server) by which "new" network elements can identify themselves and be identified by other network elements.

Such complexity has also prompted the increased adoption of standards for handling network security and other issues. For example, the Kerberos V standard provides a secure key management mechanism based on a security-key source or "trusted third party," a Key Distribution Center ("KDC"), and has apparently become a current standard of choice. Using Kerberos, a client performs mutual authentication with a KDC and thereby obtains credentials that it needs to perform authentication with an application server when presented along with a fresh authenticator. The credentials or Kerberos "ticket" contains the client's identity, a session key, a timestamp, and other information, which are all sealed using the server's secret key. The client uses a current ticket in performing mutual authentication with the application server to establish a shared session key for use in subsequent message authentication.

Unfortunately, despite the advantages of standardization, attempts to provide comprehensive solutions to specific issues before real-world implementational ramifications are known can be problematic. It is now known, for example, that the current manner of using the DHCP and Kerberos standards fail to resolve the combined problem of an "uninitialized client." More specifically, a "new" network element (e.g. newly enabled, reconfigured, re-enabled during recovery from failure, etc.) in a system that uses a dynamic assignment protocol such as DHCP will most often lack an IP address. In current DHCP-based implementations, such an uninitialized "DHCP-client" (e.g., an Internet host using DHCP to obtain configuration parameters, such as a network address) most often obtains an IP address along with other configuration parameters from a "DHCP-server" (which supplies such parameters) using DHCP. It is also desirable to authenticate DHCP exchanges to prevent denial of service attacks where DHCP clients are intentionally misconfigured, to assure a high degree of security, and for other reasons. Currently, however, DHCP is not equipped to handle authentication, especially a first message sent to a server by an uninitialized client.

The Internet Engineering Task Force or "IETF" has published two proposals for combining DHCP with Kerberos V Security. The first or "secret keys" proposal espouses authentication of a new client using secret keys which are shared between a DHCP server and its associated DHCP-clients. Unfortunately however, this proposal fails to specify how secret keys are distributed, updated or otherwise managed.

The second or "embedded keys" IETF proposal espouses embedding Kerberos key management messages and authenticators within DHCP messages. This solution is also unfortunately found to be problematic for several reasons. For example, this proposal cannot provide for authentication of the first DHCP message sent by a DHCP-client, despite the desirability of doing so. Among further examples, composite messages incorporating both DHCP and Kerberos message components are sorely over-complicated. It is also found that the proposed composite messaging cannot be easily applied to other address initialization protocols other than DHCP.

Accordingly, there is a need for network element authentication apparatuses and methods capable of providing authentication support without imposing the complexity of the current IETF proposals.

SUMMARY

The following are definitions which will be applicable for the various embodiments of the present invention. A "DHCP client" is an internet host using DHCP to obtain configuration parameters such as a network address. A "DHCP server" is an internet host that returns configuration parameters to DHCP clients. A "ticket" is a Kerberos term for a record that helps a client authenticate itself to a server. A ticket contains the client's identity, a session key, a timestamp, and other information, all sealed using the server's secret key. A ticket serves to authenticate a client when presented along with a fresh authenticator.

A "Key Distribution Center" ("KDC") is a network service that supplies tickets and temporary session keys; or an instance of that service or the host on which it runs. The KDC services both initial ticket and ticket-granting ticket (TGT) requests. The initial ticket portion is sometimes referred to as "authentication server" (or "authentication service"). The ticket-granting ticket portion is sometimes referred to as the ticket-granting server (or "ticket granting service"). A "realm" is a Kerberos administrative domain that represents a group of principals registered at a KDC. A single KDC may be responsible for one or more realms. A fully qualified principal name includes a realm name along with a principal name unique within that realm.

DHCP defines the protocol exchanges for a client to obtain its IP address and network configuration information from a DHCP Server. Kerberos V5 defines the protocol and message exchanges to mutually authenticate two parties. An objective of one embodiment is to provide authentication support for DHCP using Kerberos. The Kerberos key management exchange takes place before a client gets its IP address from the DHCP Server. Kerberos assumes that the client has a network address and can contact the KDC to obtain its credentials for authenticated communication with an application server.

An embodiment of the present invention utilizes a key exchange which uses a proxy. A transport mechanism is provided that allows an uninitialized client to contact the proxy. The Kerberos ticket returned from the key management exchange is passed to the DHCP Server.

Because an uninitialized client does not have an IP address, it often obtains this address along with other configuration parameters using DHCP. It is desirable to authenticate DHCP exchanges to at least prevent denial of service attacks, especially where DHCP clients may be intentionally misconfigured.

Kerberos is a secure key management mechanism that is based on a trusted $3^{rd}$ party, the KDC. In Kerberos a client performs mutual authentication with the KDC and in the process obtains credentials (e.g., a Kerberos ticket) that it needs for authentication to an application server (e.g., the DHCP server). The client can then use the Kerberos ticket to perform mutual authentication with the DHCP server and to establish a shared session key that would be used for subsequent message authentication.

One embodiment of the invention enables Kerberos key management to be utilized with the DHCP protocol in such a way that Kerberos key management is completely separated from the DHCP protocol. It keeps the DHCP protocol relatively simple, allows full authentication of every DHCP message and makes embodiments of the present invention easily extendable to any address initialization protocol. In order to achieve this separation, the clients do not perform key management directly with the KDC. The problem is that Kerberos assumes that the client has an IP address so that it can contact the KDC. If the address assignment phase is to be fully authenticated, the client needs the credentials from the Key Distribution Center before the IP address assignment phase.

One embodiment of the invention makes use of the concept of a Kerberos Proxy and outlines a transport mechanism between the uninitialized client and the proxy, so that Kerberos key management precedes the address assignment phase. By utilizing the Kerberos proxy, the invention avoids any changes to the Kerberos protocol, an existing public standard. Also the use of the credentials returned in the key management phase can be used to construct the contents of the authentication option in DHCP messages.

One embodiment takes a unique approach to providing authentication support for dynamic parameter assignment protocols using security protocols. Among other aspects, substantial flexibility is gained by decoupling parameter assignment exchanges from security exchanges. Added flexibility is also gained by uniquely implementing a proxy-based client-authenticator intermediary in conjunction with a transport mechanism. As a result, assignment and security protocols can, but need not, include an DHCP and Kerberos combination. In addition, embodiments of the invention are capable of increased functionality and adaptability without the extensive protocol modification, complexity and other deficiencies of prior proposed solutions.

In one embodiment, the invention provides authentication support for DHCP using Kerberos as a sequence of phases including a Kerberos key management or "authentication" phase and a DHCP parameter exchange phase. Decoupling can be achieved in part by causing DHCP-clients to perform Kerberos key management with a Key Distribution Center ("KDC") indirectly. A modified Kerberos proxy operates as a client-to-KDC intermediary. An added transport mechanism further operates as a client-to-proxy intermediary, and more specifically, as a client-proxy communication link.

An authentication and parameter exchange sequence can be initiated by a DCHP-client broadcast or other appropriate Kerberos message. The proxy, which can be invisible to the client, is configured to receive such client messages, to add realm and/or other information unknown to the client, and to forward such messages to a corresponding intra or extra-realm KDC. The results of substantially conventional KDC operation (e.g. credentials) are then returned via the proxy and transport mechanism to the client. The credentials (e.g. a conventional Kerberos ticket) can also be used to construct contents of a DHCP-message authentication option. During the subsequent parameter exchange phase, credentials are passed by the client to the now identifiable DHCP-server, and DHCP authentication and parameter assignment exchanges (e.g. including an IP address assignment) can be conducted in a largely conventional manner.

Advantageously, embodiments of the invention are capable of providing credentials to an uninitialized client in a manner that decouples key management from parameter assignment. Embodiments also enable authentication on every parameter exchange message between a client and server including, for example, a first DHCP DISCOVER request message, which is not provided by the above IETF proposals. Embodiments further enable, but do not require, the use of DHCP and are applicable to various protocols with only minimal alteration of such protocols. For example, the Kerberos ticket and/or other credentials returned during the client-KDC exchange can also be used to authenticate servers assigning addresses by non-DHCP address assignment mechanisms (e.g., realm specific IP "RSIP"), and with service specific mechanisms ("SLP"), among yet other alternatives.

Additionally, the use of one or more intermediaries between a client and authentication source (e.g. preferably a KDC where Kerberos Security is utilized) can be used to provide other capabilities (e.g. broadcast support, network element locating, process control, use of other security/protocol options, etc.), among yet further advantages.

The foregoing provisions along with various ancillary provisions and features will become apparent to those skilled in the art as the following description proceeds.

DETAILED DESCRIPTION

Figure 1:
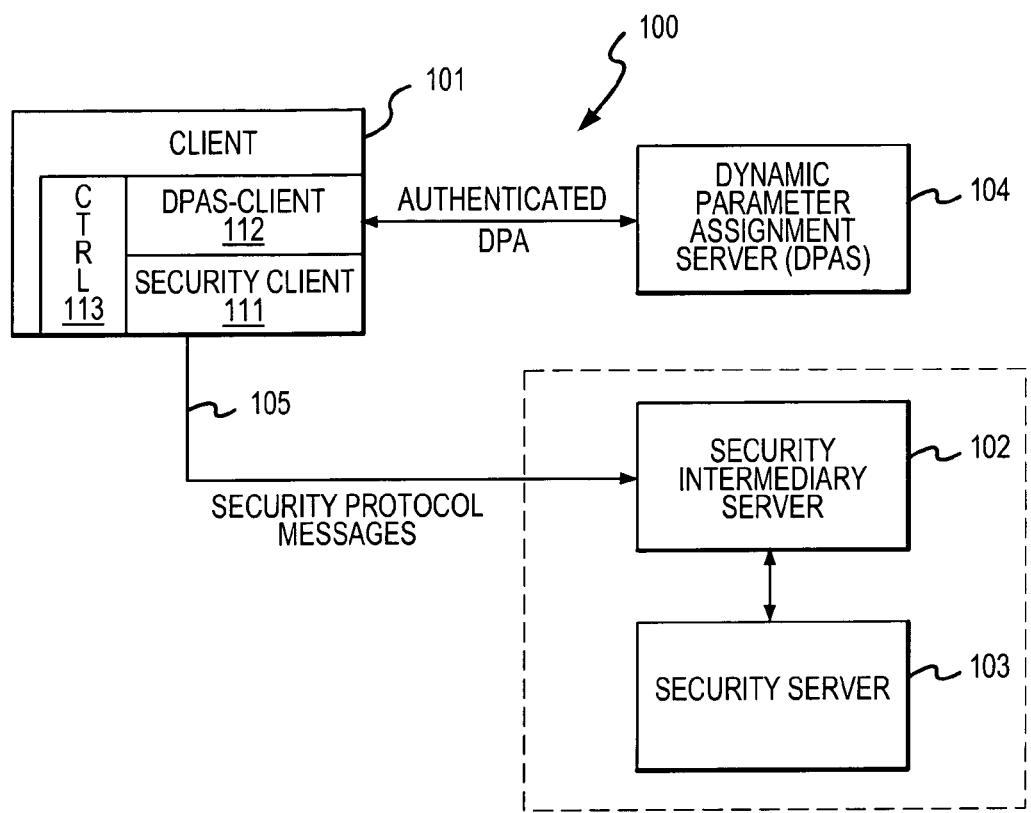
FIG. 1 is a flow diagram illustrating an example of an authenticated dynamic parameter assignment system in accordance with an embodiment of the invention.

Referring in detail now to drawings, there is seen in FIG. 1 an example of a system that is capable of conducting authenticated dynamic parameter assignment in accordance with an embodiment of the invention. As shown, system 100 includes at least one each of a client 101, a security intermediary 102, a security server 103 and a dynamic parameter assignment server 104.

Among other aspects, the architecture and operation of system 100 enables a high degree of flexibility through exchange decoupling. Such decoupling extends to not only different exchange types, but also to different elements of a given exchange type. For example, client 101 can include security client 111 and dynamic parameter assignment client ("DPA-client") 112 for conducting authentication and parameter assignment exchanges in an integrated but decoupled manner. During authentication exchanges, security client 111 initiates and conducts transfers with security server 103 via transport medium 105 and security intermediary server 102. The results of authentication exchanges are then made available to DPA-client 112 via client controller 113 for use during subsequent assignment exchanges with DPA-server (DPAS) 104.

Further decoupling is also achieved through the addition of security intermediary server 102. Security intermediary server 102 provides message routing, data distribution and other operations, and thereby facilitates both integration and decoupling of security server 103 and client 101. It will become apparent, however, that the effectiveness of security intermediary 102 does not require alteration of client 101 or even its awareness that security intermediary 102 exists.

Figure 2:
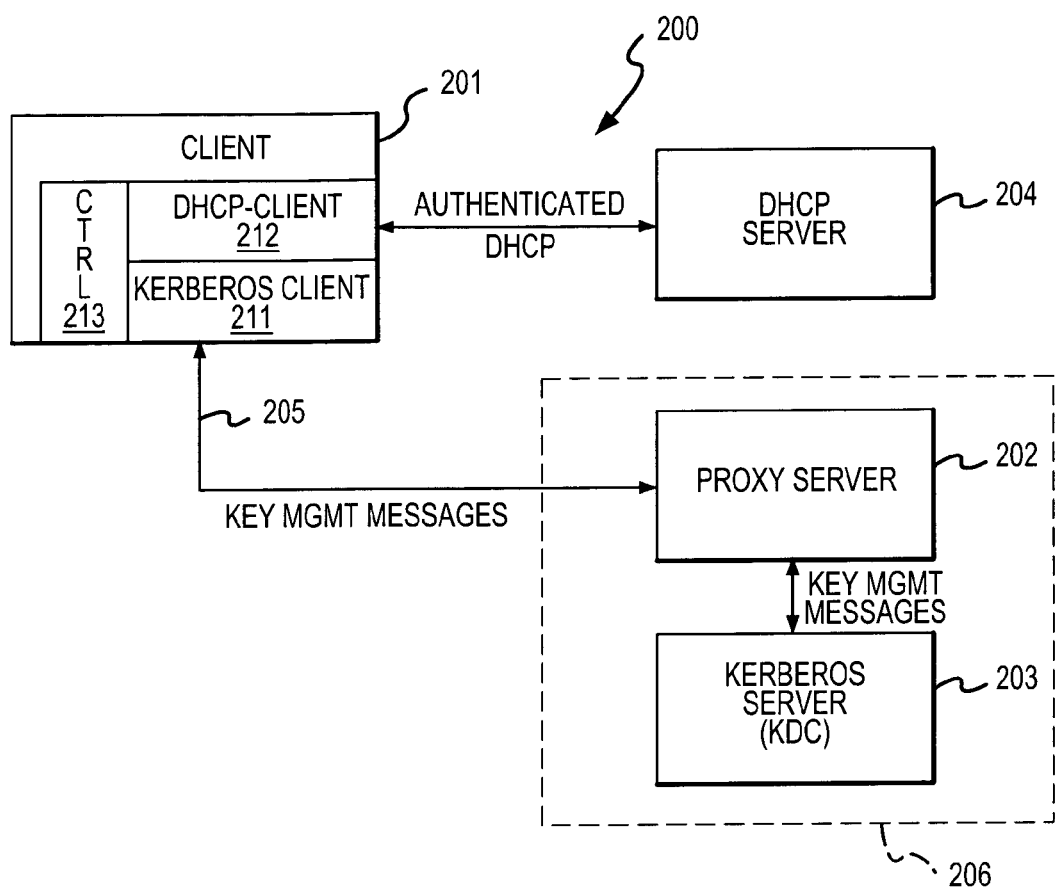
FIG. 2 is a flow diagram illustrating a more specific example of the system of FIG. 1 using Kerberos and DHCP in accordance with an embodiment of the invention.

As a result of decoupling and other aspects, system 100 is capable of utilizing any number of even disparate protocols for conducting dynamic parameter assignment and authentication exchanges, and most often with substantially no modification of the protocols. FIG. 2, for example, illustrates a more specific authenticated dynamic parameter assignment system implementation using dynamic host configuration protocol or "DHCP" for parameter assignment exchanges, and Kerberos V for authentication exchanges. Accordingly, elements 101 through 104 have been replaced by more specific elements including DHCP-Kerberos client 201, proxy server ("proxy") 202, Kerberos key distribution center ("KDC") 203 and DHCP-server 204.

Figure 12:
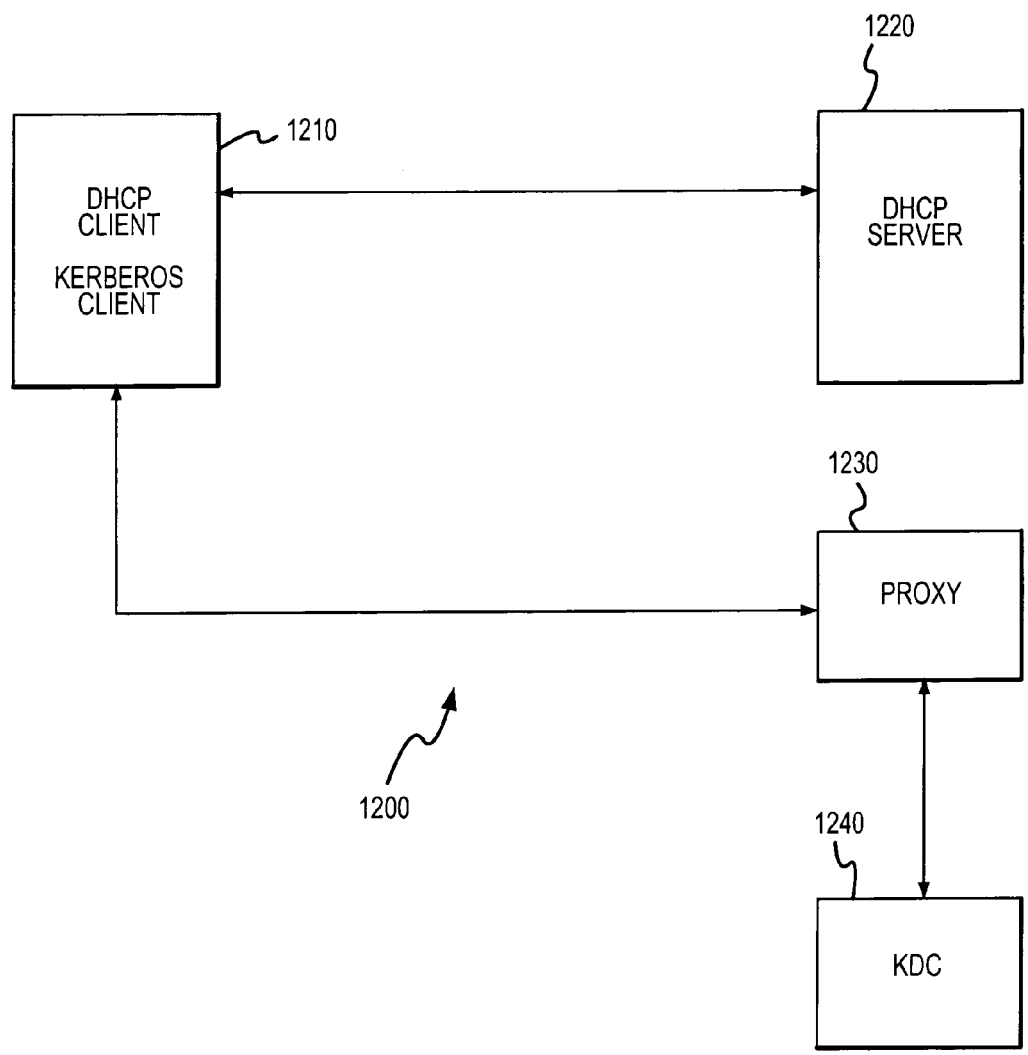
FIG. 12 is a schematic block diagram illustrating a DHCP client using a standard Kerberos message to obtain a Kerberos ticket from a KDC via a proxy server.

For clarity, the remainder of the discussion will focus primarily on the more specific implementation of the system 200 example. It will become apparent to those skilled in the art, however, that the DHCP-Kerberos configuration is by no means exclusive and much of the discussion also applies to other protocol implementations as well. For example, where DHCP is utilized, DHCP-client 212 can conduct DHCP compliant exchanges with DHCP-server 204 using substantially standard DHCP messages. However, RSIP, SLP and other protocols can also be utilized. Similarly, while Kerberos-client 211 can obtain a Kerberos ticket from KDC 203 using standard Kerberos messages, system 200 can also be reconfigured in a similar manner for use with other security/authentication protocols. In FIG. 12 there is seen a schematic block diagram illustrating a DHCP client using a standard Kerberos message to obtain a Kerberos ticket from a KDC via a proxy server.

FIG. 12 illustrates a system 1200 comprised of a client 1210, a DHCP server 1220, a proxy 1230, and a KDC 1240. The client 1210 can utilize a Kerberos Key Management message sequence (e.g., (1) AS Request, (2) AS Reply, (3) TGS Request, and (4) TGS Reply) with proxy 1230. In addition, the proxy 1230 can implement a Kerberos Key Management routine (e.g., (1) AS Request, (2) AS Reply, (3) TGS Request, and (4) TGS Reply) with the KDC 1240. Once credentials are obtained via the proxy from the KDC for the client 1210, authenticated DHCP can be performed between the client 1210 and DHCP server 1220.

Figure 3:
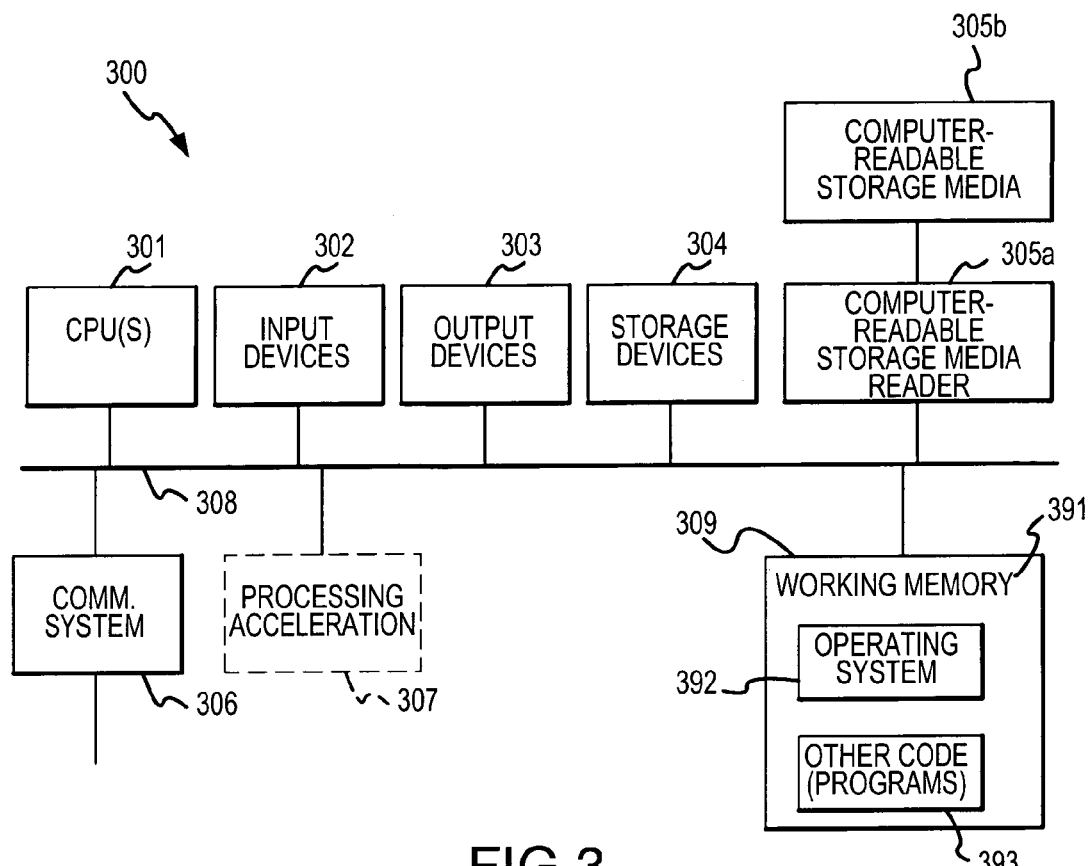
FIG. 3 illustrates an example of a processing-system based implementation applicable to elements of the systems depicted in FIGS. 1 and 2 in accordance with an embodiment of the invention.

FIG. 3 broadly illustrates how individual system 200 (and system 100) elements can be implemented in a separated or more integrated manner within various, generally similarly configured processing systems. System 300 is shown comprised of hardware elements that are electrically coupled via bus 308, including a processor 301, input device 302, output device 303, storage device 304, computer-readable storage media reader 305a, communications system 306 processing acceleration (e.g., DSP or special-purpose processors) 307 and memory 309. Computer-readable storage media reader 305a is further connected to computer-readable storage media 305b, the combination comprehensively representing remote, local, fixed and/or removable storage devices plus storage media, memory, etc. for temporarily and/or more permanently containing computer-readable information, which can include storage device 304, memory 309 and/or any other such accessible system 300 resource. System 300 also comprises software elements (shown as being currently located within working memory 391) including an operating system 392 and other code 393, such as programs, applets, data and the like.

System 300 is desirable as an implementation alternative largely due to its extensive flexibility and configurability consistent with that already enabled by the systems 100 and 200 of FIGS. 1 and 2. Thus, for example, a single architecture might be utilized to implement one or more servers that can be further configured in accordance with currently desirable protocols, protocol variations, extensions, etc. However, it will be apparent to those skilled in the art that substantial variations may well be utilized in accordance with more specific application requirements. For example, one or more system 100 and 200 elements might be implemented as sub-elements within a system 300 component (e.g. within communications system 306). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) and certainly not all system 300 components will be required in all cases.

Figure 4:
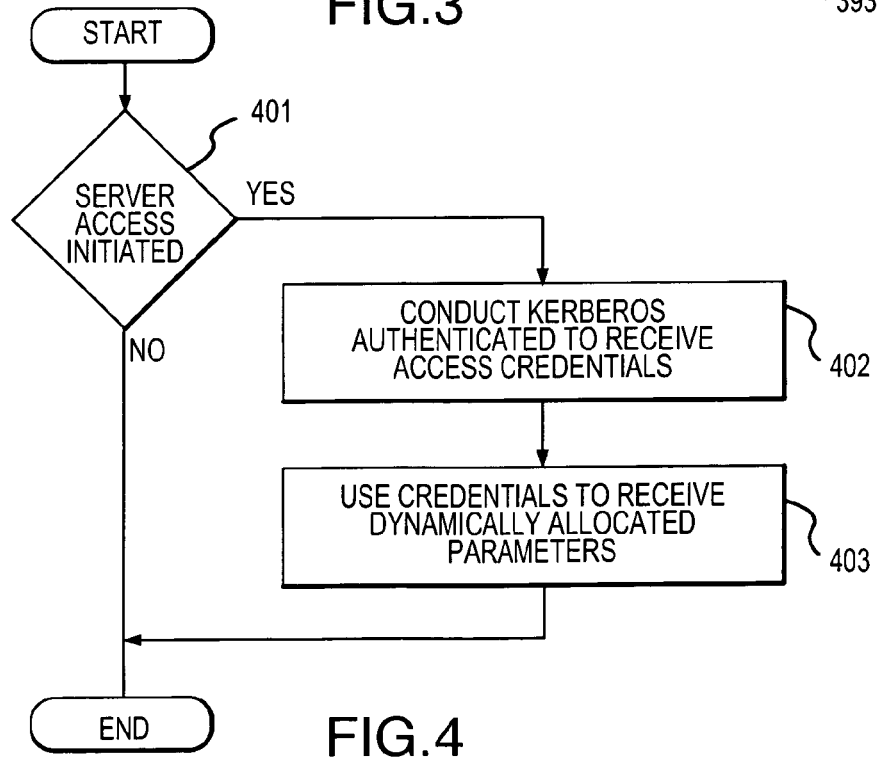
FIG. 4 is a flowchart illustrating an example of an authentication and parameter exchange phase sequence that can be implemented by a proxy server in accordance with an embodiment of the invention.

Continuing to refer to the drawing by now referencing FIG. 4, authentication and parameter exchanges operations are shown performed in a decoupled manner as a sequence of two distinct phases that can be initiated by a client seeking DHCP-server access (step 401). During an authentication phase, a Kerberos authentication exchange is conducted through which the client might receive credentials (step 402); the credentials can then be used to conduct a parameter exchange and receive dynamically allocated parameters from a DHCP-server during a parameter exchange phase (step 403).

Figure 5:
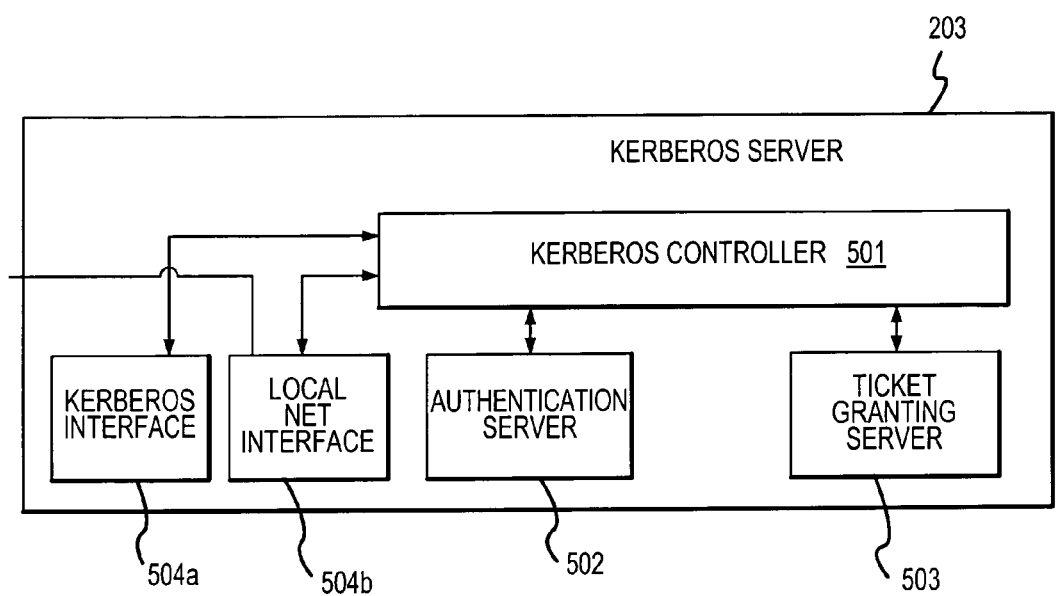
FIG. 5 is a flow diagram illustrating an example of a Kerberos server used in the system of FIG. 2, in accordance with an embodiment of the invention.

As with system 100 of FIG. 1, the substantial decoupling present in system 200 (FIG. 2) enables the authentication phase to be conducted in a manner largely consistent with that of a conventional Kerberos key management exchange. That is, a client gets a ticket granting ticket ("TGT") by contacting an authentication server within a KDC using As Request and Reply messages (see FIG. 5). The client then contacts a Ticket Granting Server in a KDC to get a server ticket using TGS_REQ and TGS_REP messages (which ticket permits initiation of the parameter exchange phase). It is also possible for a client to obtain a DHCP server ticket directly with the AS Request/Reply exchange, and without the use of the TGT.

In view of the such similarities, it might at first appear that proxy 202 and transport mechanism 205 (FIG. 2) are superfluous. Unfortunately, such an observation can actually be correct under certain circumstances, and the addition of elements 202 and 205 does present tradeoffs in comparison with other system implementation possibilities. However, unlike conventional systems employing separate authentication, where Kerberos is used for DHCP authentication, a common scenario is that of an uninitialized-client or partially initialized-client (e.g. on power-on, reset, failure recovery, etc.). An uninitialized client is a client that has not been assigned an address in a client-server network. For example, under the IP framework, a client that has not been associated with an IP address can not be addressed by the server. For example, while an uninitialized host does have a link layer address or hardware address, it does not have an IP/network address. It also does not know its KDC's IP address and may not know the DHCP-server's IP address or realm. To make matters more difficult, the KDC may not even be on the client's local network.

Before considering more specific examples, however, we will now briefly consider the broad nature of the proxy implementation utilized. Proxy 202 (FIG. 2) is a working application-specific implementation generally consistent and command-compatible with a general Kerberos proxy ("IAKERB") tool outlined in a Kerberos V specification.

Figure 6:
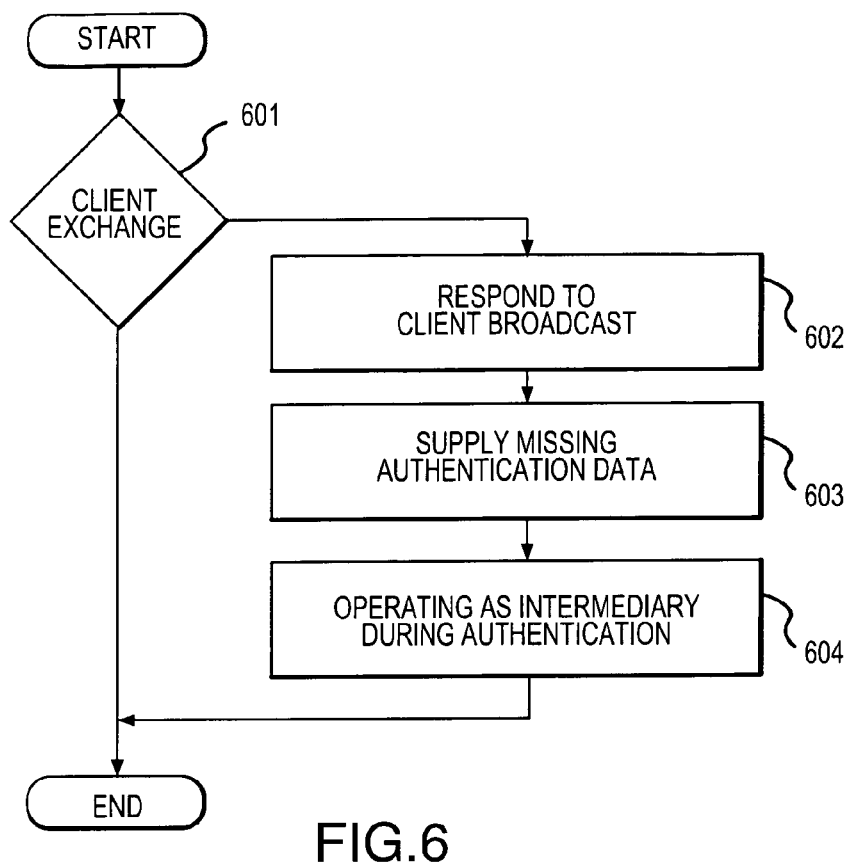
FIG. 6 is a flowchart illustrating an example of proxy server services provided during a client exchange in accordance with an embodiment of the invention.
Figure 7:
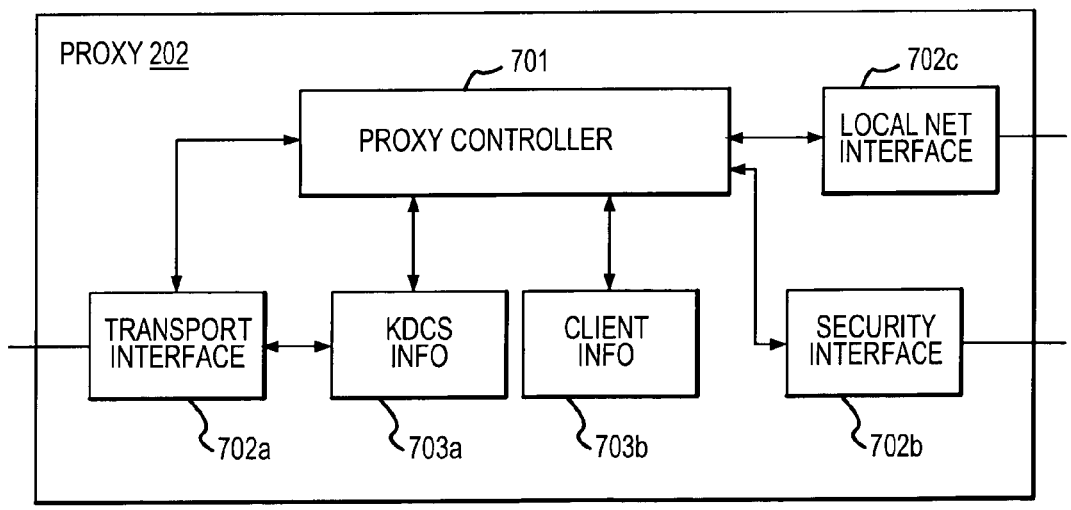
FIG. 7 is a flow diagram illustrating an example of a proxy server in accordance with an embodiment of the invention.

Note, however, that there are differences. For example, IAKERB describes a proxy as part of an application server (e.g. here, DHCP-server 204). However, in accordance with embodiments of the present invention, a proxy operates as an intermediary between a security-client and security server (e.g. a KDC), serving essentially invisibly to link and decouple the client and server as might be appropriate. FIG. 6, for example, shows how proxy operation includes "intercepting" a client exchange (step 601) in order to respond to a client broadcast (step 602), supply a client with missing authorization data, such as its own or a KDC realm (step 603) and to pass/initiate messages as might be appropriate (step 604). Consistently, the FIG. 7 proxy server example includes elements for receiving/sending messages and data such as transport interface (702a), security interface (702b) and local net interface (702c). Also included are elements for storing system KDC information (703a) and client information (703b). A proxy controller (701) is included as well. Thus, in FIG. 2, proxy server 202 would most likely be associated with KDC 203, as indicated by box 206. It turns out, however, that the present embodiment merely requires a proxy to be reachable by a corresponding client via a local network broadcast; in other respects, a proxy can utilize essentially the same IAKERB mechanisms (or other system-appropriate mechanisms) regardless of whether it is implemented as an integrated or independent application and/or device.

The following series of transaction-based examples should provide a better understanding of the use of a security intermediary, such as a proxy server. Assume, for example, that client 201 of FIG. 2 is an uninitialized-client. In this case, client 201 might not know the host address of its corresponding KDC and might instead send its first request message as a broadcast on a local network. However, first, KDC 203 might be located outside client's local network, rendering it unable to receive the broadcast; second, even assuming that KDC 203 could intercept the broadcast, it will be unable to communicate with client 201 prior to client 201 receiving an IP address.

Another example is the case in which client 201 does not know its Kerberos realm name. (A "realm" is a conventional Kerberos administrative domain that represents a group of principals registered at a KDC.) Proxy 202 is able to fill in the missing client realm name in an AS Request message, as specified in IAKERB. Note that where PKINIT pre-authenticator is used, the realm name in the AS Request may be the KDC realm name and not the client's realm name.

A further example is where a client does not know the realm name of its corresponding DHCP-server. According to IAKERB, when the client sends a TGS Request with a missing server realm name, the proxy will return to the client an error message containing the missing realm name. Note that, in this case, the proxy could return the client a wrong realm name and the client could be fooled into obtaining a ticket for the wrong DHCP-server (on the same local network). However, the wrong DHCP-server will still be a registered principal in a KDC database. In some circumstances this may be an acceptable compromise.

Figure 9A:
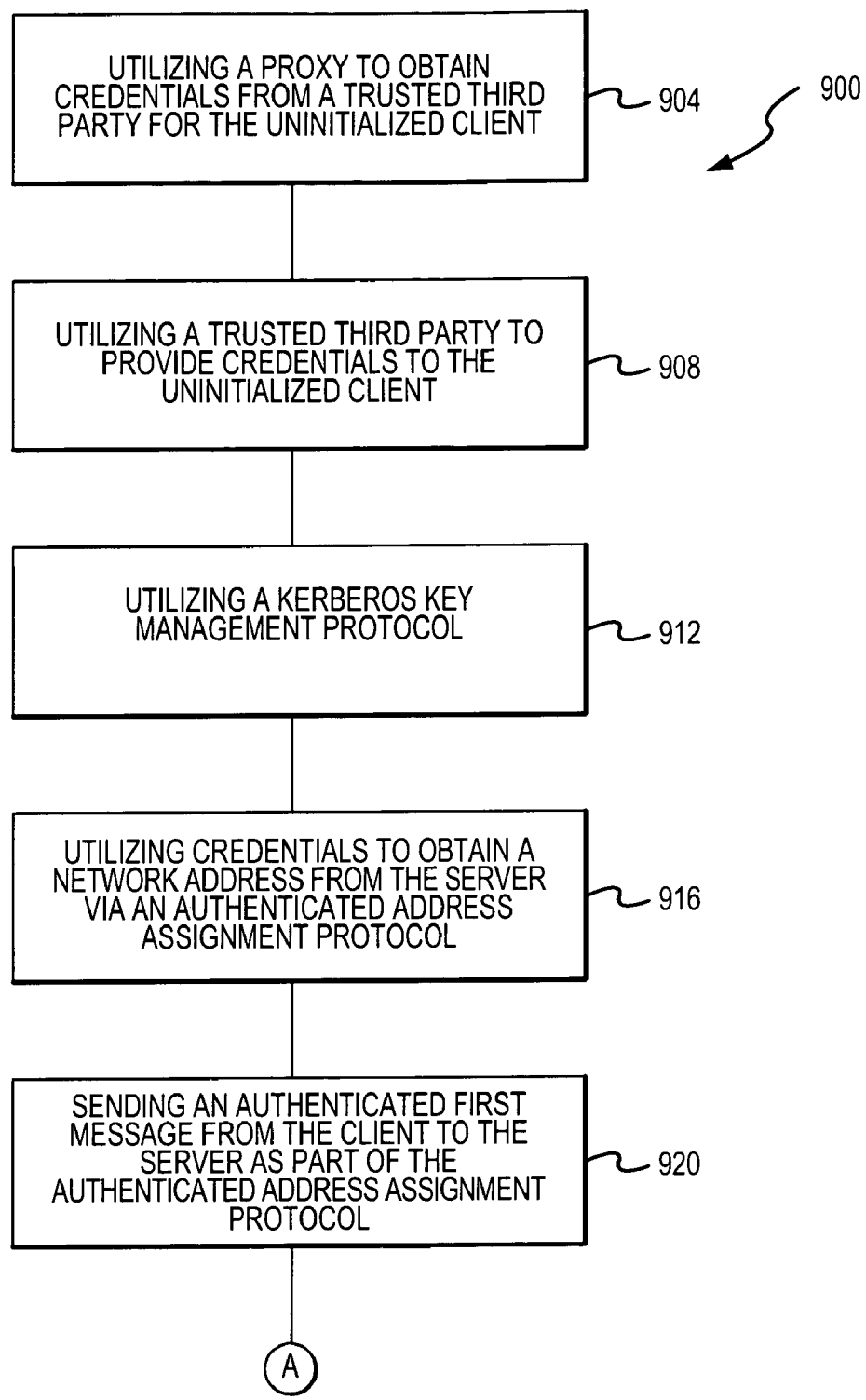
FIGS. 9a and 9b are a flowchart illustrating an example of an embodiment of the invention for performing authentication and address assignment.
Figure 9B:
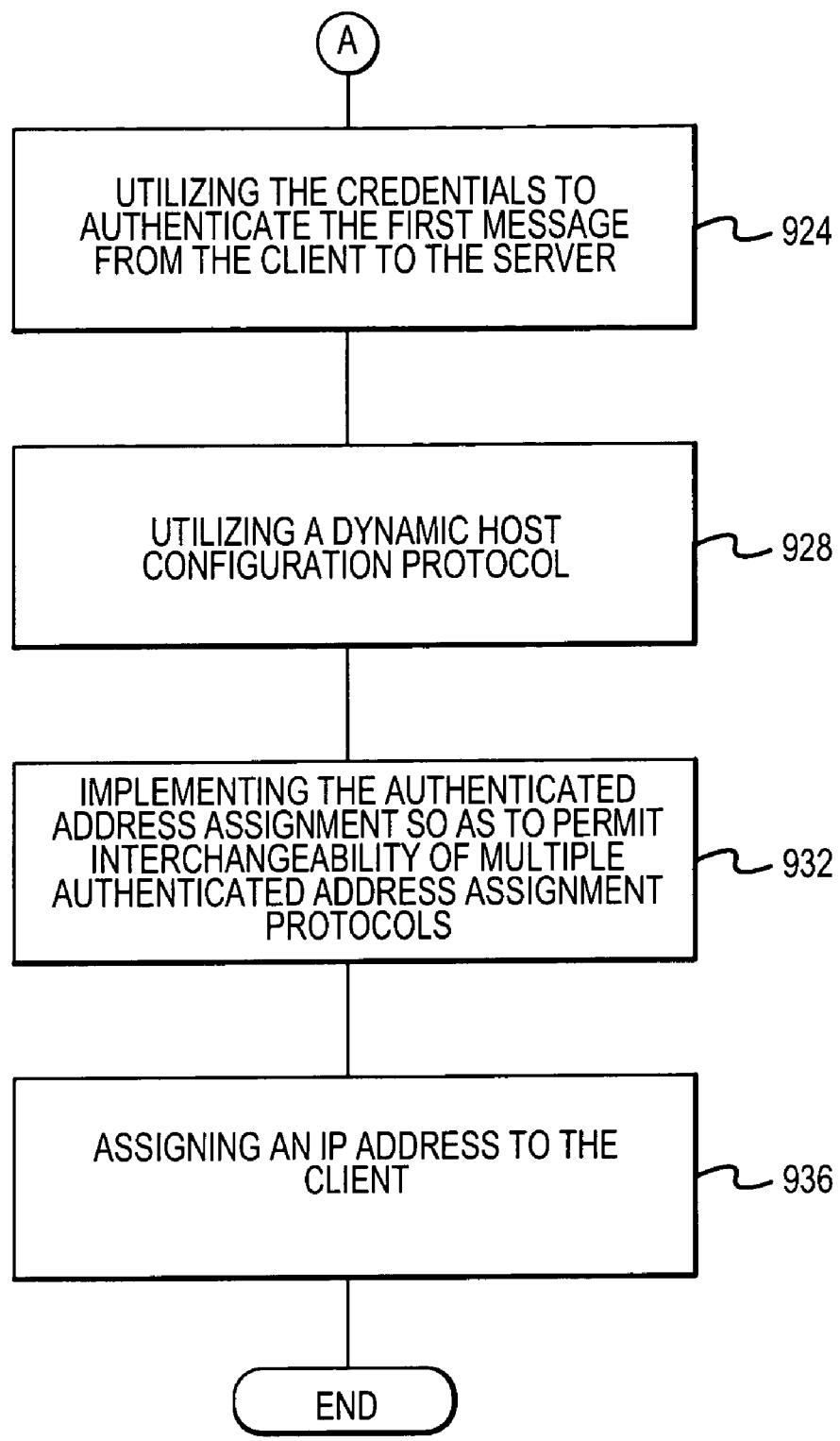

FIGS. 9a and 9b show a flowchart illustrating a method of implementing an embodiment of the invention. In block 904 of flowchart 900, a proxy is utilized to obtain credentials for an uninitialized client. Block 908 illustrates that a trusted third party can be utilized to provide the credentials for the uninitialized client, for example, via a Kerberos KDC. This is illustrated further via block 912 in which a Kerberos key management protocol is referenced. The Kerberos key management protocol can be used for example to accomplish authentication between the client and the proxy and/or the proxy and the trusted third party (e.g., the KDC). Once the credentials are obtained for the uninitialized client, the credentials are utilized to obtain a configuration parameter (e.g., an address) for the uninitialized client via an authenticated address assignment protocol, as illustrated in block 916. This can be initiated as shown by block 920 in which an authenticated first message from the client to the server is sent as part of the authenticated address assignment protocol. Thus, the server can utilize the credentials to authenticate this first message received from the client, as illustrated by block 924.

Block 928 of flowchart 900 illustrates that a dynamic host configuration protocol (DHCP) can be utilized as the address assignment protocol. Furthermore, block 932 illustrates that the implementation of the authenticated address assignment can be configured so as to allow one of a plurality of different protocols to be implemented as the address assignment protocol. Thus, for example, RSIP could be selected and interchanged in place of DHCP without impacting the prior authentication phase. Finally, block 936 of FIG. 9b illustrates that an address such as an IP address can be assigned to the client by the server, as a result of performing the address assignment protocol.

Cross-Realm Authentication

Figure 8:
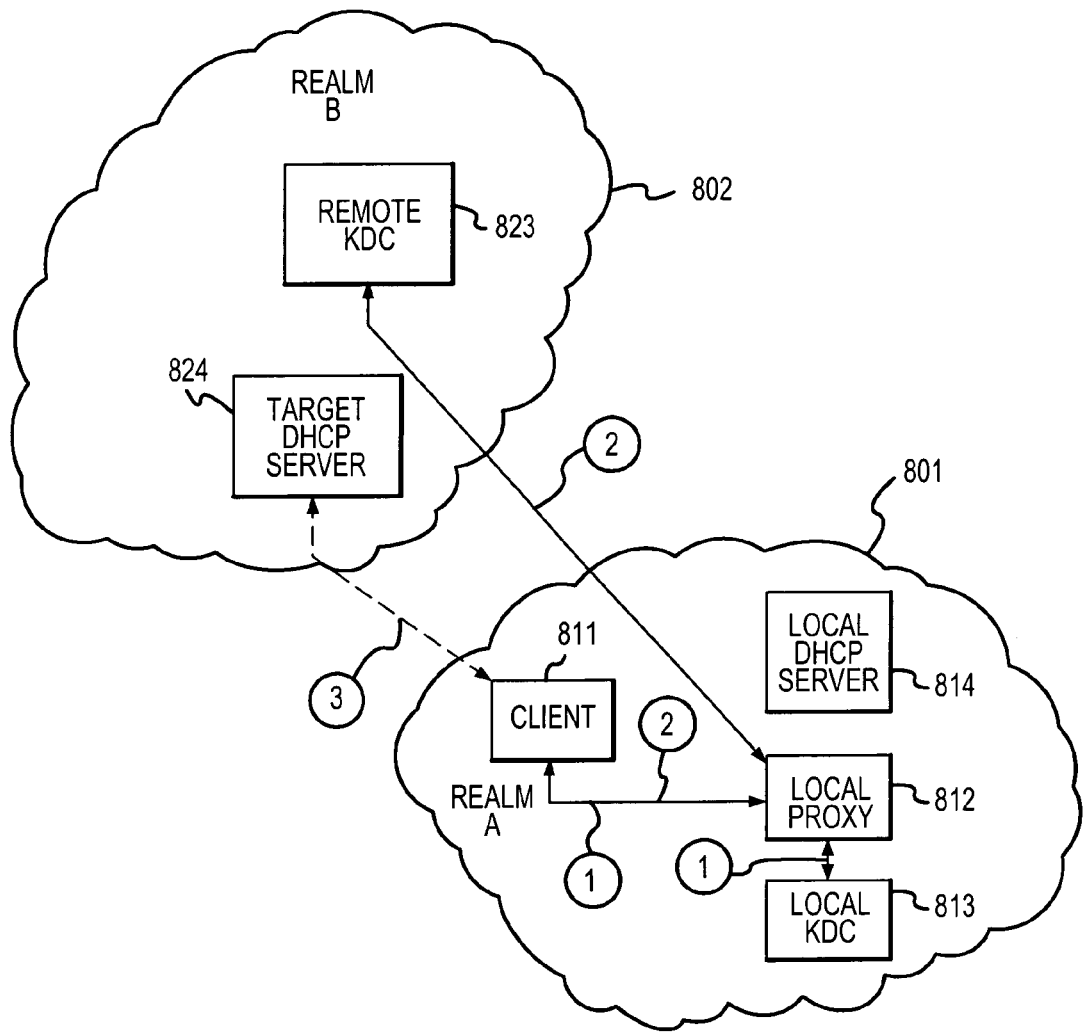
FIG. 8 is a flow diagram illustrating an example of an authentication exchange in accordance with an embodiment of the invention.

Turning now to FIG. 8, the discussion thus far has focused primarily on the case of a client communicating with a single KDC via a proxy. However, the present embodiment is also applicable to cases in which the DHCP-client's realm is different from the DHCP-server's realm. In such a case, a client must initiate an exchange that includes its own and its target-DHCP's realm plus permission from its local-KDC to communicate remotely.

Thus, because consistency with IAKERB permits only one requirement to be supplied to client 811 at a time, client 811 does not know its own or its target's realm. When its target is in a remote realm, client 811 must initiate several exchange-1's within Realm-A 801 via local-proxy 812. Realm A 801 is comprised of a local DHCP server 814. Local-proxy 812, which maintains a KDC-list, supplies client 801 first the unknown client realm and then the unknown target realm, including or excluding local-KDC 813 from the exchange as discussed next. Client 811 will then initiate two more exchanges (via local-proxy 812), first to acquire from local-KDC 813a cross-realm ticket-granting ticket ("TGT"), and then to initiate exchange-2 to remote-KDC 823 of Realm-B 802, by sending a ticket request with a TGT identifier via local-proxy 812. Finally, remote-KDC returns a ticket for target-DHCP server 824 via local-proxy 812. However, turning also to FIG. 4, which broadly illustrates the steps of the method used in the above and following examples, a client must still initiate an exchange with a target-server (via a local-proxy) before the ticket times out.

After a client has obtained a Kerberos ticket for the DHCP-server, it can use the ticket as part of an authentication option in the DHCP messages. The DHCP protocol is extended to provide for the addition of a new authenticator type based on Kerberos tickets.

The following example illustrates in greater detail the specific exchange requests and ramifications of the FIG. 8 example where a client does not know its own or its target's realm, and its target is in a remote realm:

1a) The client sends an AS Request with NULL realm to the proxy.
1b) The proxy fills in the realm and forwards the AS Request to the KDC in the client's realm.
1c) The KDC issues a TGT and returns an AS Reply to the proxy.
1d) The proxy forwards the AS Reply to the client.
2a) The client sends a TGS Request for a principal name 'dhcpsrvr' with a NULL realm to the proxy.
2b) The proxy returns an KRB_AP_ERR_REALM_REQUIRED error with the DHCP server's realm to the client.
3a) The client sends another TGS Request for a cross-realm TGT to the proxy.
3b) The proxy forwards the TGS Request to the KDC in the client's realm.
3c) The KDC issues a cross-realm TGT and returns a TGS Reply to the proxy.
3d) The proxy forwards a TGS Reply to the client.
4a) The client sends a TGS Request to the proxy for a principal 'dhcpsrvr' with the realm name filled in, using a cross-realm TGT.
4b) The proxy forwards TGS Request to the KDC in the DHCP server's realm.
4c) The KDC issues a ticket for the DHCP server and sends a TGS Reply back to the proxy.
4d) The proxy forwards the TGS Reply to the client.

In a more general case, the client may need to contact any number of KDCs in different realms before it can get a ticket for the DHCP server. In each case, the client would again initiate an exchange with and receive a response from a corresponding KDC via the local-proxy server. It is appreciated that a reduced number of exchanges can also be achieved where desirable (e.g. by priority, returning multiple locations, altering time periods, etc.) and other modifications are also expected in accordance with specific applications. However, changes that increase complexity and/or sacrifice portability should be carefully weighed against host/network size and resources, benefits and other considerations.

Public Key Authentication

The present embodiment also enables clients to perform public key authentication to a KDC based on the PKINIT specification. (In this case, the size of AS Request and AS Reply messages will likely exceed the maximum UDP packet size, IP fragmentation should be enabled to allow a client to contact a proxy with a local broadcast.)

Assuming that a DHCP client that is not a registered principal (in the KDC principal database) is using PKINIT:

1) The client sends an AS Request with a PKINIT Request pre-authenticator to the proxy. The request includes the client's signature and X.509 certificate. The KDC realm field is left as NULL.
2) The proxy fills in the realm and forwards the AS Request to the KDC in the filled in realm. This is the realm of the DHCP server. Here, the client's realm is the name of a Certification Authority and not the same as the KDC realm.
3) The KDC issues a TGT and sends back an AS Reply with a PKTNIT Reply pre-authenticator to the proxy.
4) The proxy forwards the AS Reply to the client.
5) The client sends TGS Request for a principal name 'dhcpsrvr' with the realm found in the TGT to the proxy.
6) The proxy forwards TGS Request to the KDC in the DHCP server's realm.
7) The KDC issues a ticket for the DHCP server and sends TOS Reply back to the proxy.
8) The proxy forwards TGS Reply to the client.

Broadcast Message Generation and Handling

As was already noted, an uninitialized-client will lack most if not all IP/network address and domain information. Such a client will therefore initiate an exchange by way of a local network broadcast, and one of the functions of a proxy is to accept broadcast Kerberos request messages (AS_REQ and TGS_REQ) and relay them to the appropriate KDC. An uninitialized client formulates a broadcast AS_REQ or TGS_REQ as follows:

The request payload contains the client hardware address in an address field with a negative value for the address type. Kerberos V allows for the usage of negative address types for "local" use. Note, however, that IAKERB discourages the use of the address field for network addresses may not be known or may change in situation where proxies are used. Nevertheless, it is preferable, in accordance with the present embodiment, to incorporate the negative values permitted in the Kerberos transport within the address type field of both the AS_REQ and TGS_REQ messages. The negative value should be the -ve number of the hardware address type "htype" value (from assigned numbers RFC) used in RFC 2131. The address field of the message contains the client's hardware address.

The request payload is UDP encapsulated and addressed to port 88 on the server/proxy, and the UDP source port is selected by the client. The source and destination network addresses are selected respectively as all-zero's address and the broadcast address. For IPv4, the source IP address is set to 0.0.0.0 and the destination IP address is set to 255.255.255.255. The data link layer header source address corresponds to the link layer/hardware address of the client. The destination link layer address is the broadcast address at the link layer (e.g. for Ethernet the address is ffffffff).

In the case where AS_REQ message contains a PKINIT pre-authenticator for public key-based client authentication the message will most likely not fit into a single UDP packet.

As noted, it is assumed that the proxy server on a network is configured with a list of KDC's, their realms and their IP addresses. The proxy server acts as a client in communicating with the KDC and forwards standard Kerberos messages to/from the KDC using unicast UDP or TCP transport mechanisms.

The proxy, upon receiving a broadcast request from a client, records the client's hardware address that appears as the source address on the frame as well as in the address field of the request message. Based on the realm of the KDC specified in the request, the proxy determines the KDC to which this message is relayed as a unicast message from the proxy to the KDC. In the case that the client left the KDC realm name as NULL, it is up to the proxy to first determine the correct realm name and fill it in the request. The proxy then forwards the request to the KDC.

The KDC, upon receiving the request, formulates a response (AS_REP or TGS_REP). The KDC includes the client's address field in the encrypted part of the ticket and the response is unicast to the proxy.

The proxy, upon receiving a broadcast-reply from the KDC, retrieves the previously saved hardware address of the client. It then broadcasts the reply as a network layer broadcast on its local network using—at the link level—the hardware address obtained from the address field of the request.

The client, upon receiving a broadcast response having a link layer destination address as its hardware address and a network layer address as the broadcast address, must verify that the hardware address in the ticket corresponds to its link layer address. Upon receiving a TGS_REP (or an AS_REP with the application server ticket) from the proxy, the client will have enough information to securely communicate with the application server (the DHCP-server in this case), as specified in the following section.

Authenticated Message Exchange Between the DHCP Client and the DHCP Server

A DHCP-client uses the ticket returned in the TGS response for two purposes. First, the client uses the ticket to establish a shared session key with the DHCP server. Second, the client also includes the ticket as part of a Kerberos authenticator in the DHCP request.

If the size of the authenticator is greater than 255 bytes, the DHCP authentication option is repeated multiple times. When the values of all the authentication options are concatenated together, they will make up the complete authenticator.

Once the session key is established, the following messages, which are sent by both the DHCP client and the DHCP server, will use an authenticator defined as protocol 1.

Figure 10:
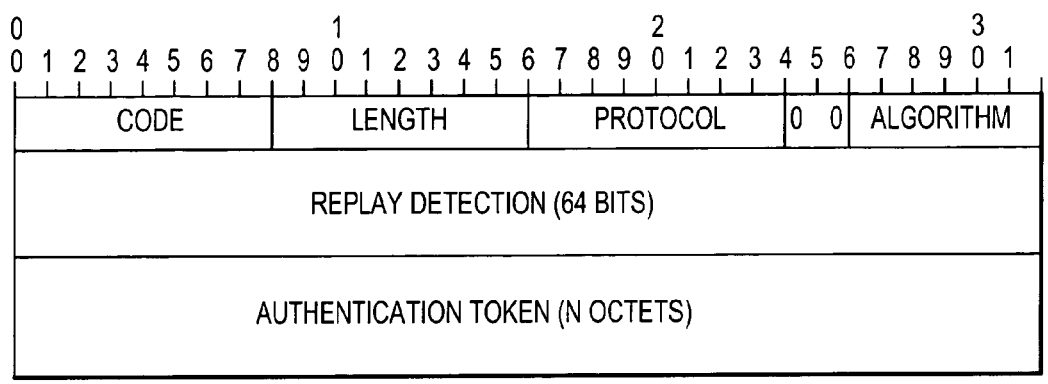
FIG. 10 illustrates a Kerberos authenticator format for a DHCP request message used in conjunction with the system of FIG. 2 in accordance with an embodiment of the invention.
Figure 11:
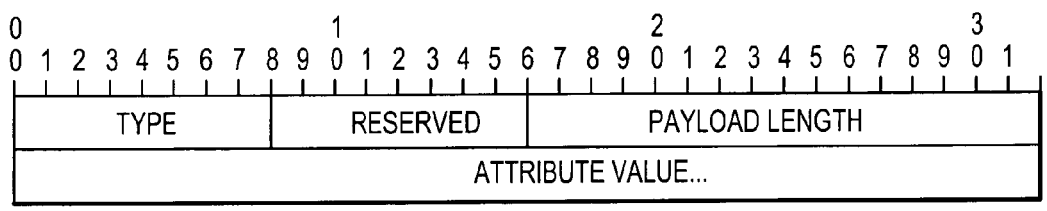
FIG. 11 illustrates an authenticator token format used in conjunction with the system of FIG. 2 in accordance with an embodiment of the invention.

FIG. 10 illustrates the format of the Kerberos authenticator for a DHCP request message. The code for the authentication option is open, and the length field contains the length of the remainder of the option, starting with the protocol field. The value of the protocol field for this authenticator is 2, and the algorithm field can take the value HMAC-MD5 or HMAC-SHA-1. The replay protection field is a monotonically increasing counter field. Inside the Kerberos authenticator, it may be set to any value. However, this field is monotonically increasing in messages sent by the client (inside an authenticator using protocol 1) that are included in the following Table 1. Table 1 also lists the attributes that are included as type-value-attributes within the authentication token, the format of which is given in FIG. 11.

TABLE 1

| Type | Attribute Name | Value |
|---|---|---|
| 0 | Message Integrity Code | Depends on the value of the algorithm field. Its length is 16 bytes for HMAC-MD5 and 20 bytes for HMAC-SHA-1. The Kerberos session key found in the Kerberos ticket is used directly as an HMAC key (see security considerations). |
| 1 | AP_REQ | ASN.1 encoding of Kerberos AP_REQ message. |

AP_REQ contains the Kerberos ticket for the DHCP server and also contains information needed by the DHCP server to authenticate the client. After verifying the AP_REQ and decrypting the Kerberos ticket, the DHCP server is able to extract a session key which it now shares with the DHCP client.

The Kerberos authenticator token contains its own replay protection mechanism inside the AP_REQ structure. The AP_REQ contains a time stamp that is within a time window at the DHCP server that has been agreed upon. However, this does not require the DHCP clients to maintain an accurate clock between reboots. Kerberos allows clients to synchronize their clock with the KDC with the help of Kerberos KRB_AP_ERR_SKEW error message.

The DHCP server can save both the session key and its associated expiration time found in the Kerberos ticket. Until the expiration time, the server can accept client requests with the authenticator using protocol 1, with the Kerberos session key as the MD5 HMAC key.

All DHCP server responses may also contain an authenticator using protocol 1, with the same Kerberos session key as the MD5 HMAC key.

When the session key expires, it is up to the client to obtain a new ticket from the KDC and to attach a Kerberos authenticator to the next DHCP request message (instead of the authenticator given by protocol 1).

As noted, the above examples represent certain tradeoffs. In addition to those already mentioned, the following are expected to provide a basis for implementational variations consistent with more specific application considerations.

1) The above examples could be modified such that DHCP-clients know the DHCP-server's realm ahead of time, thereby providing for full 2-way authentication. Such modification would, however, might require an additional configuration parameter.

2) The above examples could also be modified such that DHCP-clients would not require any additional configuration information other than a password or a key (and a public key certificate if PKINIT is used).

3) In the above examples, the Kerberos session key is used directly as an HMAC key to authenticate DHCP message. Standard security practice, however, is to use different keys for different purposes. Thus, the Kerberos session key is used to encrypt a part of an AP_REQ message.

Thus, while the present invention has been described herein with reference to particular embodiments thereof various changes and substitutions are intended in the foregoing disclosure, and it will be appreciated that in some instances some features of the invention will be employed without a corresponding use of other features without departing from the scope and spirit of the invention as set forth. Therefore, many modifications may be made to adapt a particular situation or material to the central scope and spirit of the present invention. It is intended that the invention not be limited to the particular embodiment disclosed as the best mode to contemplated for carrying out this invention, but that the invention will include all embodiments and equivalents falling within the scope of any appended claims.

What is claimed is:

1. A method of providing configuration parameters to an uninitialized client in a client-server broadcast network, said method comprising:
    receiving at a proxy connected to said broadcast network a local broadcast communication initiated by said uninitialized client and intended for reception at a trusted key source, wherein said local broadcast communication includes the hardware address for said uninitialized client and wherein said proxy operates as a security intermediary between said uninitialized client and said trusted key source;
    recording said hardware address for said uninitialized client at said proxy;
    adding at said proxy authorization data to said received local broadcast communication when said received local broadcast communication does not include said authorization data;
    forwarding said received local broadcast communication from said proxy to said trusted key source;
    utilizing said trusted key source to perform a mutual authentication with said unitialized client;
    generating at said trusted key source a ticket which includes said hardware address for said uninitialized client to said proxy;
    forwarding said ticket, upon successful completion of the mutual authentication, from said trusted key source to said uninitialized client via said client-server broadcast network; and
    employing said ticket to obtain a network address from said server via an authenticated address assignment protocol.

2. The method as described in claim 1 and wherein said employing said ticket to obtain a network address comprises:
    sending an authenticated first message in said authenticated address assignment protocol from said uninitialized client to said server.

3. The method as described in claim 2 wherein said authenticated first message is authenticated with said ticket.

4. The method as described in claim 1 wherein said utilizing a trusted key source to provide ticket to said proxy comprises:
    utilizing a Kerberos key management protocol.

5. The method as described in claim 1 wherein said employing said ticket to obtain a network address from said server via an authenticated address assignment protocol comprises:
    utilizing Dynamic Host Configuration Protocol.

6. The method as described in claim 1 wherein said employing said ticket to obtain a network address from said server via an authenticated address assignment protocol comprises:
    utilizing said authenticated address assignment protocol selected from a set of a plurality of address assignment protocols.

7. The method as described in claim 6 wherein said plurality of authenticated address assignment protocols comprises:
    Dynamic Host Configuration Protocol; and
    RSIP.

8. The method as described in claim 1 wherein said employing said ticket to obtain a network address from said server via an authenticated address assignment protocol comprises:
    obtaining an IP address.

9. The method as described in claim 1 wherein said act of employing a trusted key source to provide ticket to said uninitialized client is not embedded in said authenticated address assignment protocol.

10. The method as described in claim 1, wherein said authorization data identifies a realm.

11. The method as described in claim 10, wherein said realm is a Kerberos administrative domain that represents a group of principals registered at a Kerberos key distribution center.

12. The method as described in claim 11, wherein said realm comprises at least one of an uninitialized client realm, a Kerberos realm, or a Dynamic Host Configuration Protocol server realm.

* * * * *

UNITED STATES PATENT AND TRADEMARK OFFICE
CERTIFICATE OF CORRECTION

PATENT NO. : 7,451,312 B2  Page 1 of 1
APPLICATION NO. : 09/799918
DATED : November 11, 2008
INVENTOR(S) : Medvinsky et al.

It is certified that error appears in the above-identified patent and that said Letters Patent is hereby corrected as shown below:

ON THE TITLE PAGE:

COLUMN 2:
Line 14: Under "Other Publications", please delete "Uniersity," and replace with --University,--

COLUMN 7:
Line 7: Please delete "modern" and insert --modem--

COLUMN 10:
Line 51: Please delete "PKTNIT" and replace with --PKINIT--
Line 58: Please delete "TOS" and replace with --TGS--

Signed and Sealed this

Twenty-eighth Day of July, 2009

JOHN DOLL
*Acting Director of the United States Patent and Trademark Office*